US006971352B2

(12) United States Patent
Meintschel et al.

(10) Patent No.: US 6,971,352 B2
(45) Date of Patent: Dec. 6, 2005

(54) DEVICE FOR THE RELATIVE ANGULAR ADJUSTMENT OF A CAMSHAFT WITH RESPECT TO A DRIVE WHEEL

(75) Inventors: Jens Meintschel, Esslingen (DE); Thomas Stolk, Kirchheim (DE); Götz Von Esebeck, Mahlow (DE); Alexander Von Gaisberg-Helfenberg, Beilstein (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/809,293

(22) Filed: Mar. 25, 2004

(65) Prior Publication Data

US 2004/0206322 A1 Oct. 21, 2004

(30) Foreign Application Priority Data

Apr. 3, 2003 (DE) ................................ 103 15 151

(51) Int. Cl.$^{7}$ .................................................. F01L 1/34
(52) U.S. Cl. .............................. 123/90.17; 123/90.15; 123/90.31
(58) Field of Search .......................... 123/90.17, 90.15, 123/90.31

(56) References Cited

U.S. PATENT DOCUMENTS

| | | | | |
|---|---|---|---|---|
| 3,978,829 A * | 9/1976 | Takahashi et al. | ....... | 123/90.15 |
| 4,850,247 A | 7/1989 | Yu | | |
| 4,988,329 A * | 1/1991 | Lammers | .................... | 475/337 |
| 6,523,512 B2 * | 2/2003 | Axmacher et al. | ....... | 123/90.17 |

FOREIGN PATENT DOCUMENTS

| | | |
|---|---|---|
| DE | 41 33 408 | 4/1993 |
| DE | 100 38 354 | 2/2002 |

* cited by examiner

*Primary Examiner*—Thomas Denion
*Assistant Examiner*—Zelalem Eshete
(74) *Attorney, Agent, or Firm*—Klaus J. Bach

(57) ABSTRACT

In an adjustment device for a camshaft of an internal combustion engine for varying the phase relationship of a camshaft with respect to a crankshaft as a function of the operating point of the internal combustion engine, the adjustment device comprises an epicyclic gear structure with a drive-side and an output side ring wheel, which are in meshing engagement with planet wheels, and the output-side ring wheel has a number of teeth different from that of the drive-side ring wheel so that the position of the camshaft relative to the crankshaft can be adjusted via an electric servomotor which drives a central sun wheel.

4 Claims, 1 Drawing Sheet

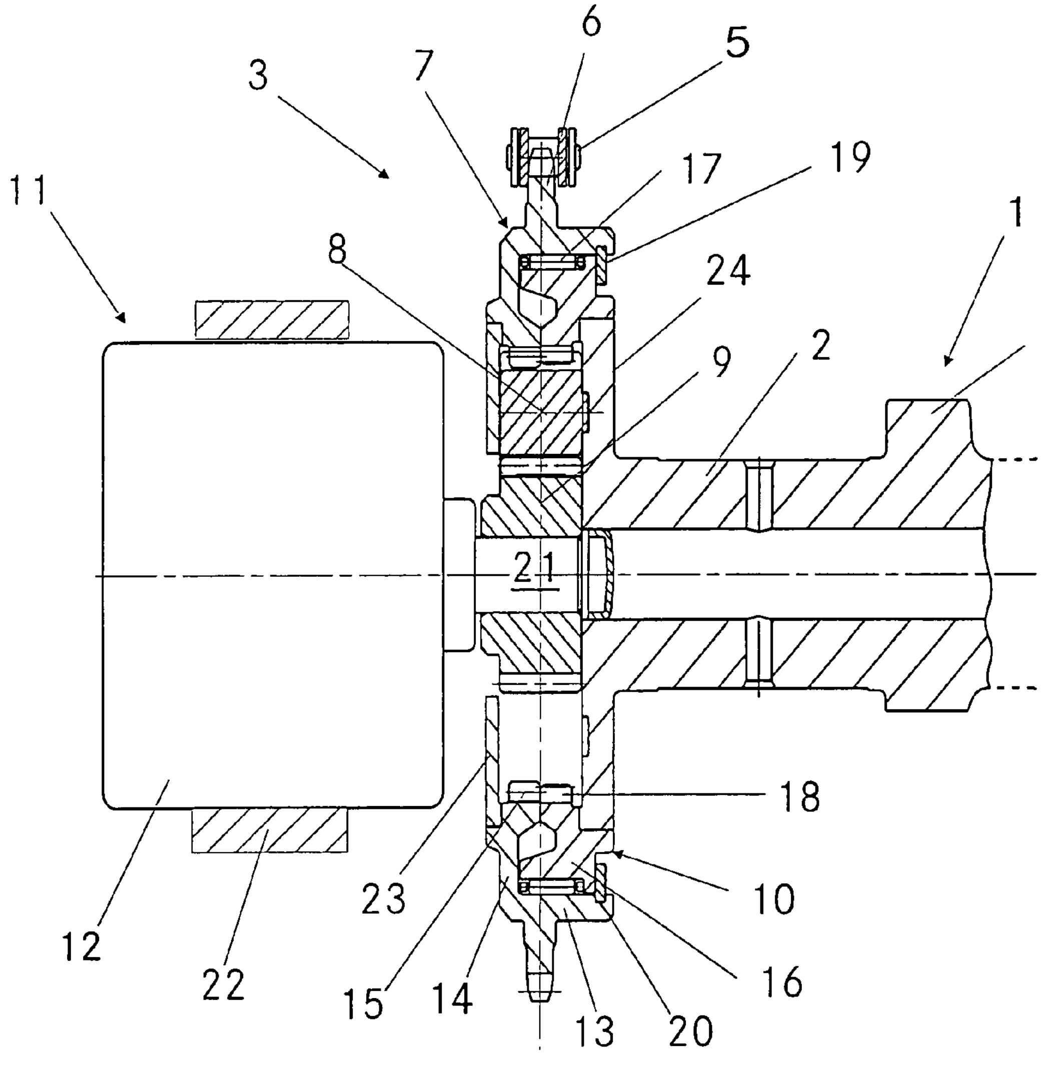
6
5
3
7
17
19
11
8
24
1
9
2
4
21
18
10
23
12
22
15
14
13
20
16

DEVICE FOR THE RELATIVE ANGULAR ADJUSTMENT OF A CAMSHAFT WITH RESPECT TO A DRIVE WHEEL

BACKGROUND OF THE INVENTION

The invention relates to a device for the relative angular adjustment of a camshaft of an internal combustion engine with respect to a drive wheel driving the camshaft, by means of an epicyclic gear which has a drive-side ring wheel connected to the drive wheel, a planet wheel and a central sun wheel, and which includes an actuating means capable of driving the central sun wheel as a function of camshaft timing requirements, and which, furthermore, includes a drive connection from the epicyclic gear to the camshaft.

DE 41 33 408 A1 discloses a generic device, in which the camshaft is driven by the crankshaft via the outer ring wheel as a drive wheel, that is, the power is supplied to the camshaft via the planet wheel. The central sun wheel is retained in position, while the phase relationship between camshaft and drive wheel remains unchanged, by an electrical control device including a motor. In the event of a desired phase adjustment, the electrical actuating device is energized, and the central sun wheel is rotated in one direction or the other, depending on the desired phase displacement.

With this device however, only small transmission ratios can be provided, and therefore the electrical adjustment device includes, in addition to the electric motor, a worm gear for driving the central sun wheel. This is a disadvantage with regard to costs and outlays in structural terms and weight.

Further relevant adjustment devices are known from DE 100 38 354 A1 and DE 41 33 408 A1. As regards the design of an epicyclic gear of this type, reference is made to U.S. Pat. No. 4,850,247.

It is the object of the invention to provide an adjustment device for a camshaft of an internal combustion engine, which is capable of quickly responding, which requires only a few structural elements, and which is small and relatively inexpensive.

SUMMARY OF THE INVENTION

In an adjustment device for a camshaft of an internal combustion engine for varying the phase relationship of a camshaft with respect to a crankshaft as a function of the operating point of the internal combustion engine, the adjustment device comprises an epicyclic gear structure with a drive-side and an output side ring wheel, which are in meshing engagement with planet wheels, and the output-side ring wheel has a number of teeth different from that of the drive-side ring wheel so that the position of the camshaft relative to the crankshaft can be adjusted via an electric servomotor which drives a central sun wheel.

The arrangement requires only few components, so that a slender form of construction of the adjustment device is obtained, which provides for a space-saving arrangement. The adjustment device may be designed with spur toothing, so that no forces have to be supported in the axial direction, thus further simplifying the construction.

Moreover, there is also a substantial advantage in a selectable high step-up transmission ratio between actuating means and camshaft, thus making it possible to have a direct drive of the actuating means in order to vary the phase relationship, without a further step-up gear being interposed. This results in low-noise operation of the adjustment device. Finally, the adjustment device according to the invention has very high efficiency because it has a few teeth in engagement with one another.

The FIGURE illustrates an exemplary embodiment of an adjustment device of the invention for a camshaft of an internal combustion engine, which device is shown in a longitudinal sectional view.

An internal combustion engine, not illustrated, has a camshaft 1 for controlling the gas exchange valves. An adjustment device 3 for varying the phase relationship of the camshaft 1 or of the cams 4 with respect to the crankshaft is flanged to the drive-side end 2 of the camshaft 1. The camshaft 1 is driven by the crankshaft via a chain 5 and a chain wheel 6 mounted on the adjustment device 3.

The adjustment device 3 is in the form of a coupled epicyclic or planetary gear drive and comprises a drive-side ring wheel 7, a plurality of planet wheels 8, a central sun wheel 9 and an output-side ring wheel 10. Preferably, three planet wheels 8 are provided, which are in meshing engagement with the central sun wheel 9 and simultaneously with both the drive-side ring wheel 7 and with the output-side ring wheel 10. Since the output to the camshaft 1 always takes place via the ring wheel 10, the planet wheels 8 are inserted, shaftless, between the ring wheels 7, 10 and the sun wheel 9 without any special planet wheel mounting.

So that a step-up or a change in the phase relationship between the ring wheel 7 and the ring wheel 10 is achieved, the ring wheel 10 has a larger number of teeth than the ring wheel 7. The larger number of teeth of the ring wheel 10 is achieved by means of a profile displacement. According to this measure, familiar to a person skilled in the toothing art, the profile reference line of the toothing of the ring wheel 10 is displaced, starting from the reference diameter, in the direction of the root diameter of the toothing, until the desired number of teeth is reached.

In this case, however, the diameter of the root circle of the toothing for the ring wheel 10 and the toothing modulus remain unchanged. Since the root diameter of the toothing and the diameter of the base circle of the toothing for the ring wheel 7 and also its toothing modulus are the same, the two ring wheels 7 and 10 can continue to be in meshing engagement with the planet wheels 8.

A phase displacement of the camshaft 1 is initiated by the central sun wheel 9, in that the sun wheel 9 is rotated about its axis via an actuating means 11 which may be, for example, an electric servomotor or a hydraulic pivoting motor. In the exemplary embodiment, it is an electric servomotor 12.

The construction of the adjustment device 3 provides, in particular, for the ring wheel 7 a ring 13 which has a pot-shaped configuration and which is produced by sintering as a sheet-metal pressed part or lathe-turned part. On its outside, the chain wheel 6 is integrally formed in one piece with the ring 13. A radial web 14 is bent over at one axial end of the ring 13 and forms a hub opening, at which the internal toothing 15 of the ring wheel 7 is provided.

The interior of the ring 13 in which the output-side ring wheel 10 is received is likewise configured as an annular element 16 on which the ring wheel 7 is supported via a roller bearing 17. This nested form of construction provides for an adjustment device 3 of relatively narrow design. As in the case of the ring 13, the inner opening of the annular element 16 is provided with an internal toothing 18 which lies, together with the internal toothing of the ring wheel 7, on a common axis of rotation. As already stated, the internal toothing 18 has a larger number of teeth, achieved by profile displacement, than the internal toothing 15 on the ring 13.

The ring wheels inserted one into the other are fixed axially, on the one hand, by the toothings, 15, 18 so as to bear against one another and, on the hand, by means of a securing ring 19 which is inserted into a groove 20 in the region of the opening of the ring 13 and which bears on the outside of the annular element 16.

The ring wheels 7 and 10 are in meshing engagement by means of their toothings with a plurality of, for example three planet wheels 8 which are arranged, distributed uniformly, in the space between the ring wheels 7, 10 and the sun wheel 9 and of which only one planet wheel is illustrated in section in the drawing. Furthermore, the planet wheels 8 mesh with the central sun wheel 9 which is mounted fixedly in terms of rotation on a drive shaft 21 of the electric servomotor 11 which, in turn, is firmly anchored in a housing, indicated by 22, of the internal combustion engine.

The planet wheels 8 are disposed between the two ring wheels 7 and 10 and the sun wheel 9 merely loosely without any special mounting. The axial guidance of the planet wheels 8 is provided by a thrust washer 23 connected to the web 14, for example by welding, and by a flange 24 which is integrally formed on the camshaft and which is firmly connected to the annular element 16 of the output-side ring wheel 10, for example by welding.

According to the exemplary embodiment, in the case of a constant phase relationship, the servomotor 12 is not activated and is stationary. When the internal combustion engine is operating normally, therefore, the planet wheels 8 roll along the ring wheels 7, 10 and the sun wheel 9. A version with a servomotor which rotates at the rotational speed of the camshaft in the case of a constant phase relationship would also be conceivable. This would have the advantage of slightly reduced rolling friction, since the planet wheels would then be stationary relative to the ring wheels.

The phase relationship of the camshaft 1 may be varied in a leading or a trailing direction, depending on the direction of rotation of the servomotor 12.

What is claimed is:

1. A device for the relative angular adjustment of a camshaft of an internal combustion engine with respect to a drive wheel (6) driving the camshaft (4), comprising an epicyclic gear structure (16) having a drive-side ring wheel (7) connected to the drive wheel (6), a planet wheel (8) and a central sun wheel (9), an actuating means (12) connected to, and driving the central sun wheel (9), as a function of requirements, and a drive connection from the epicyclic gear structure (16) to the camshaft, said drive connection being formed by an output-side ring wheel (10) which is in meshing engagement with the planet wheel (8) and which has a number of teeth differing from that of the drive-side ring wheel (7), said output-side ring wheel (10) being rotatably supported at its circumference in said drive-side ring wheel (7) centrally around the gear structures and said planet wheels (8) being disposed, without shaft bearings, axially between a thrust washer (23) mounted on the ring wheel (7) and a flange (24) on the camshaft (1) for securing the planet wheels (8) in the axial direction.

2. The device for the relative angular adjustment of a camshaft with respect to a drive wheel driving the camshaft as claimed in claim 1, wherein the output-side ring wheel (10) has a larger number of teeth than the drive-side ring wheel (7).

3. The device for the relative angular adjustment of a camshaft with respect to a drive wheel driving the camshaft as claimed in claim 1, wherein the ring wheel (7) has a pot-shaped contour with an open side and the ring wheel (10) is axially inserted into the interior of the ring wheel (7) in such a way that the two ring wheels (7, 10) are arranged coaxially adjacent one another with their internal toothing (15, 18), and the drive-side ring wheel (7) is supported on the output-side ring wheel (10) via a roller bearing (17).

4. The device for the relative angular adjustment of a camshaft with respect to a drive wheel driving the camshaft as claimed in claim 1, wherein the sun wheel (9) is mounted firmly on a drive shaft (21) of the actuating means (11) which is an electric servomotor (12).

* * * * *